(12) United States Patent  
Ayala et al.

(10) Patent No.: US 7,530,377 B2  
(45) Date of Patent: *May 12, 2009

(54) PORTABLE WORK BENCH

(75) Inventors: Adan Ayala, Owing Mills, MD (US); Ronald Quiram, Phoenix, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/376,963

(22) Filed: Mar. 16, 2006

(65) Prior Publication Data

US 2006/0180244 A1    Aug. 17, 2006

Related U.S. Application Data

(63) Continuation of application No. 10/835,813, filed on Apr. 30, 2004, now Pat. No. 7,048,021, which is a continuation of application No. 10/449,270, filed on May 30, 2003, now Pat. No. 6,748,987, which is a continuation of application No. 10/151,507, filed on May 20, 2002, now Pat. No. 6,595,251, which is a continuation of application No. 09/760,386, filed on Jan. 12, 2001, now Pat. No. 6,415,831, which is a continuation of application No. 09/357,500, filed on Jul. 20, 1999, now Pat. No. 6,199,608, which is a continuation of application No. 09/207,355, filed on Dec. 8, 1998, now Pat. No. 5,988,243, which is a continuation-in-part of application No. 08/899,937, filed on Jul. 24, 1997, now Pat. No. 5,875,828.

(60) Provisional application No. 60/070,501, filed on Jan. 6, 1998, now abandoned.

(51) Int. Cl.  
*B25H 1/04* (2006.01)  
*B25H 1/14* (2006.01)

(52) U.S. Cl. .................. 144/286.5; 144/287; 182/181.1; 182/183.1; 182/186.4; 182/186.6

(58) Field of Classification Search .............. 144/286.1, 144/286.5, 287; 182/181.1, 183.1, 186.4, 182/186.6

See application file for complete search history.

(56) References Cited

U.S. PATENT DOCUMENTS 4,206,910 A    6/1980    Biesemeyer  
4,341,247 A    7/1982    Price (Continued)

*Primary Examiner*—Shelley Self  
(74) *Attorney, Agent, or Firm*—Adan Ayala

(57) ABSTRACT

An improved portable work bench includes a structural body, and a platform disposed on the structural body. In addition, the platform includes a cam mechanism for locking the position of the platform along the structural body. Further, the portable work bench may include a plurality of legs for supporting the structural body. The structural body may be tubular and preferably has a square cross-section. Accordingly, the user need only place the platform in any position along the length of the structural body and move the cam mechanism to lock the platform in place. The cam mechanism may include a cam pivotally attached to the platform near the structural body, so that when the user rotates the cam, the cam contacts the structural body, locking the platform. A plate may be disposed between the cam and the structural body. The plate may have a hook portion, which contacts the bottom surface of the structural body.

19 Claims, 2 Drawing Sheets

U.S. PATENT DOCUMENTS

| | | | |
|---|---|---|---|
| 4,817,693 A | | 4/1989 | Schuler |
| 5,320,150 A | * | 6/1994 | Everts et al. ................. 144/287 |
| 5,592,981 A | * | 1/1997 | Derecktor ................. 144/286.1 |
| RE35,627 E | * | 10/1997 | Estrem ....................... 144/329 |
| 5,836,365 A | * | 11/1998 | Derecktor ................... 144/287 |
| 5,875,828 A | * | 3/1999 | Quiram et al. .............. 144/329 |
| 5,988,243 A | * | 11/1999 | Ayala et al. .................. 144/329 |
| 6,199,608 B1 | * | 3/2001 | Ayala et al. ............... 144/286.1 |
| 6,415,831 B2 | * | 7/2002 | Ayala et al. ............... 144/286.1 |
| 6,595,251 B2 | * | 7/2003 | Ayala et al. ............... 144/286.1 |
| 6,748,987 B2 | * | 6/2004 | Ayala et al. ............... 144/286.5 |
| 7,048,021 B2 | * | 5/2006 | Ayala et al. ................. 144/287 |

* cited by examiner

PORTABLE WORK BENCH

CROSS-REFERENCE TO RELATED APPLICATIONS

This application is a continuation of U.S. patent application Ser. No. 10/835,813, filed Apr. 30, 2004, now U.S. Pat. No. 7,048,021, which is in turn a continuation of U.S. patent application Ser. No. 10/449,270, filed May 30, 2003, now U.S. Pat. No. 6,748,987, which is in turn a continuation of U.S. patent application Ser. No. 10/151,507, filed May 20, 2002, now U.S. Pat. No. 6,595,251, which is in turn a continuation of U.S. patent application Ser. No. 09/760,386, filed Jan. 12, 2001, now U.S. Pat. No. 6,415,831, which is in turn a continuation of U.S. patent application Ser. No. 09/357,500, filed Jul. 20, 1999, now U.S. Pat. No. 6,199,608, which is in turn a continuation of U.S. patent application Ser. No. 09/207,355, filed Dec. 8, 1998, now U.S. Pat. No. 5,988,243, which in turn is a continuation-in-part of U.S. patent application Ser. No. 08/899,937, filed Jul. 24, 1997, now U.S. Pat. No. 5,875,828. application Ser. No. 09/207,355 also derives priority from U.S. application Ser. No. 60/070,501, filed Jan. 6, 1998, now abandoned.

FIELD OF THE INVENTION

This invention relates generally to work benches and more particularly to a portable work bench that can support a power tool and a workpiece.

BACKGROUND OF THE INVENTION

It is common in the construction industry for users to bring their power tools to the work site. Thus, the users require a work surface at the work site to support the power tools for use. Preferably the work surface is at a certain height so that the user can comfortably use the power tool. In addition, the work surface should also be sufficiently portable to be easily moved around a work site.

In the past, users have disposed their power tools on sheets of wood which are in turn supported by two or more sawhorses. This arrangement, however, lacks the strength for efficient operation, as well as being difficult to move around the work site.

Accordingly, different support stands or work benches have been proposed in order to provide a portable work surface that can support a power tool. Some of these prior art solutions have been described in U.S. Pat. Nos. 1,864,840, 4,860,807, 4,874,025, 4,974,651, 5,193,598, and 5,421,231. However, these prior art solutions do not provide a platform supporting the power tool which can be moved horizontally so that the power tool can be moved without moving the workpiece.

Other prior art solutions, such as the one described in U.S. Pat. No. 5,592,981, provide a platform supporting the power tool which can be moved horizontally so that the power tool can be moved without moving the workpiece. However, they require that the user insert and slide the platform from the end of the workbench towards the desired position on the workbench.

SUMMARY OF THE INVENTION

In accordance with the present invention, an improved portable work bench is employed. The portable work bench includes a structural body, and a platform disposed on the structural body. In addition, the platform includes a cam mechanism for locking the position of the platform along the structural body. Further, the portable work bench may include a plurality of legs for supporting the structural body. The structural body may be tubular and preferably has a square cross-section.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
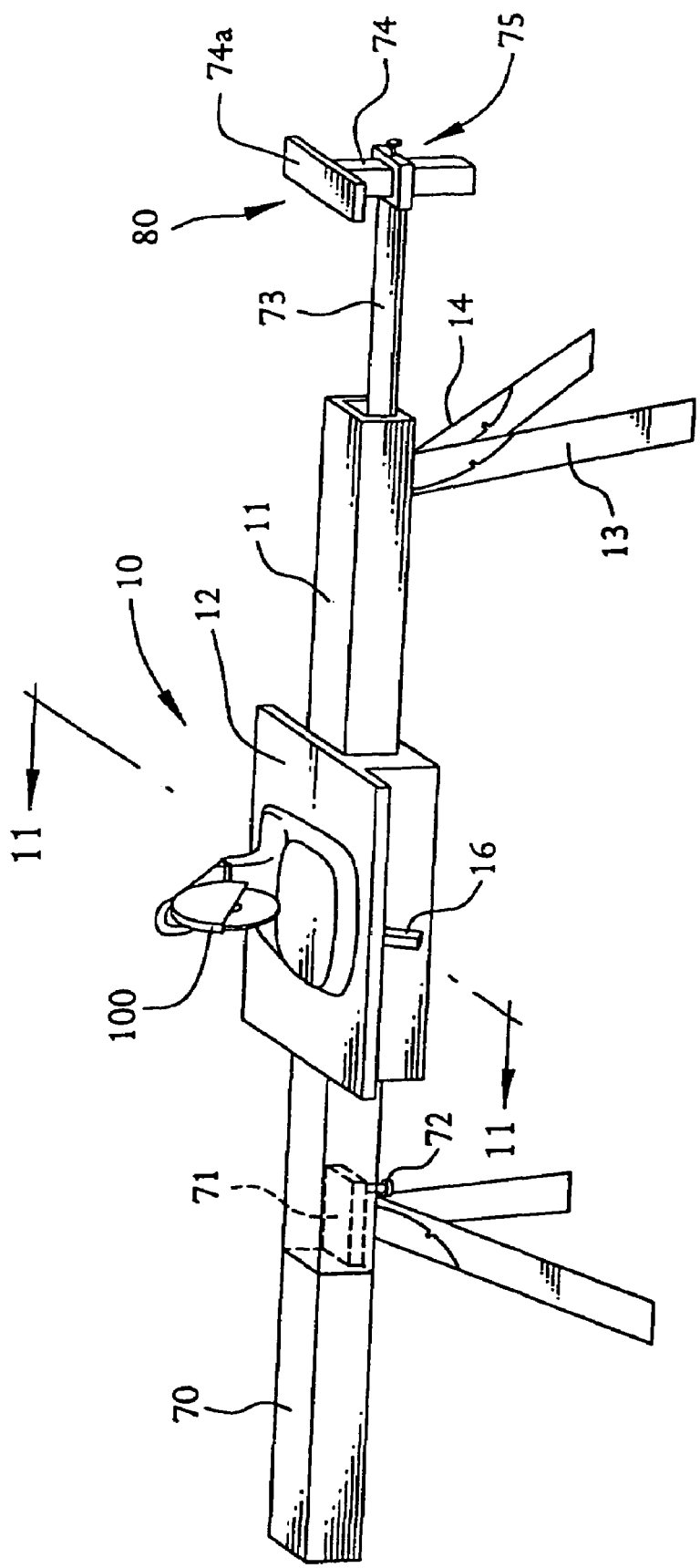
FIG. 1 is a perspective view of a portable work bench of the present invention.

The invention is now described with reference to the accompanying figures, wherein like numerals designate like parts. Referring to FIG. 1, a portable work bench 10 of the present invention is shown carrying a chop saw 100. However, persons skilled in the art will recognize that the work bench 10 can support any power tool, such as a sliding compound miter saw, a drill press, a table saw, etc., any hand tools, or anything else that needs to be supported.

The work bench 10 has a structural body 11 and a platform 12 disposed on the structural body 11. In addition, the work bench 10 may have legs 13 for supporting the structural body 11 and platform 12. The legs 13 may be connected to the body 11 via brackets 14 as is well known in the art. Persons skilled in the art are referred to U.S. Pat. Nos. 4,605,099 and 5,592,981, which disclose exemplary means for providing foldable legs for the work bench. However, persons skilled in the art will know that fixed legs which do not fold will also function properly.

Figure 2:
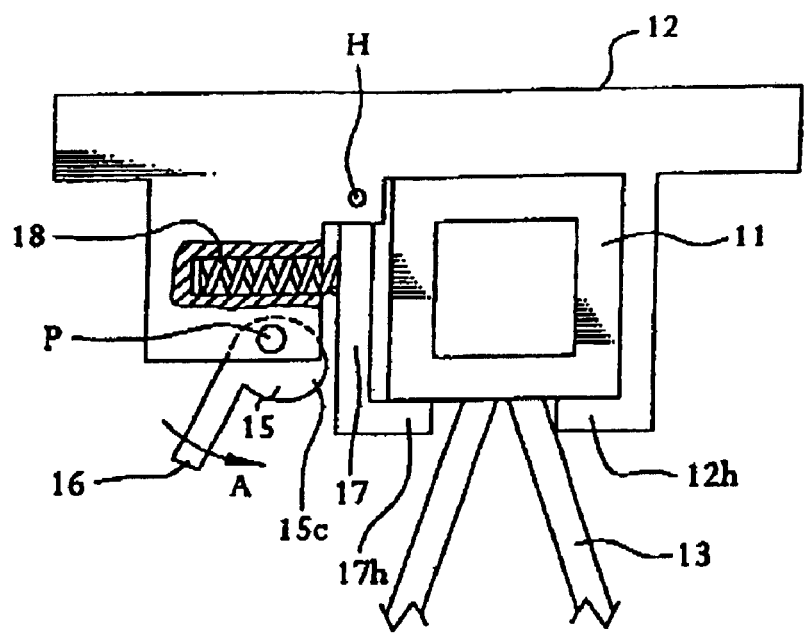
FIG. 2 is a cross-sectional side view of a first embodiment of the work bench along plane II-II-II of FIG. 1.

Referring to FIG. 2, the structural body 11 is preferably tubular so that it can withstand substantial amounts of torsional and lateral loads applied thereto. Furthermore, the cross-section of the structural body 11 is preferably square.

The platform 12 is preferably designed to receive a power tool 100 thereon in the manner well known in the art. As mentioned above, the platform 12 is disposed on the structural body 11. As seen in FIG. 2, the platform 12 may contacts the top and rear surfaces of the body 11. Platform 12 may also contact the bottom surface of the body 11 via a hook portion 12h.

Platform 12 may also have a cam 15 pivotally attached thereto and pivotable about axis P. A handle 16 is connected to cam 15 so that, upon movement of handle 16, cam 15 moves.

In addition, platform 12 may have a locking plate 17 pivotally attached thereto and pivotable about axis H. Locking plate 17 may pivot between a first position contacting the structural body 11 and a second position not contacting the structural body 11. A spring 18 may be connected between locking plate 17 and platform 12 to bias locking plate 17 towards the second position.

In order to lock platform 12 on the desired position along structural body 11, the user need only move handle 16 along direction A. This will cause cam 15 to rotate and bring cam portion 15c against locking plate 17. As cam 15 is rotated, the locking plate 17 is moved further towards the first position until it contacts structural body 11. Locking plate 17 may have a hook portion 17*h* to further contact the structural body 11 when in the first position. To unlock platform 12, the user need only move handle 16 in the opposite direction.

Figure 3:
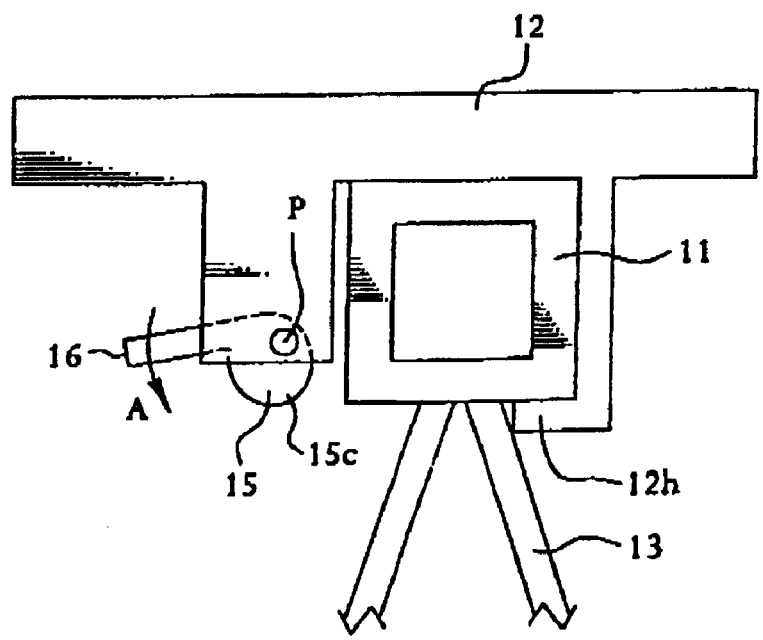
FIG. 3 is a cross-sectional side view of a second embodiment of the work bench along plane II-II-II of FIG. 1.

Persons skilled in the art will recognize that the same result, i.e., locking platform 12 on a desired position along structural body 11, may be achieved without locking plate 17 and spring 18, as shown in FIG. 3. Instead, cam 15 will contact structural body directly.

In addition, persons skilled in the art will recognize that extensions can be added to the portable work bench as is well known in the art. Referring to FIG. 1, extension 70 can be inserted into the structural body 11 in order to increase its length, allowing the user to move the platform 12 along a greater length. Preferably, extension 70 has the same cross-section as the structural body 11. Extension 70 preferably has a fixed inner joint 71, which can be inserted into the structural body 11. The joint 71 can then be secured by means of a screw or pin assembly 72.

A workpiece support mechanism 80 can also be used on the work bench. This mechanism can support an elongated workpiece, such as moldings, etc., so that the user can cut it accurately.

The support mechanism 80 has a bar 73, which is slidably attached to the structural body 11. A clamp assembly 75 is disposed at the end of bar 73. The clamp assembly 75 slidably receives and clamps a bar 74. A support end 74*a* is in turn disposed at the end of bar 74. Accordingly, a user can adjust the bar 74 and support end 74*a*, and then adjust the bar 73 so that the workpiece is properly supported.

Persons skilled in the art may recognize other additions or alternatives to the means disclosed herein. However, all these additions and/or alterations are considered to be equivalents of the present invention.

What is claimed is:

1. A portable workbench comprising:
   a structural body having a longitudinal axis;
   a plurality of legs supporting the structural body;
   a platform disposed on the structural body; and
   a locking mechanism disposed on the platform, said locking mechanism including a first hook portion, said locking mechanism being rotatable about a first axis between a first position locking the platform on the structural body and a second position unlocking the platform, the first axis being substantially parallel to the longitudinal axis, and the hook portion advancing generally under the structural body as the locking mechanism rotates from the second position to the first position to grip the structural body between the platform and the hook portion.

2. The work bench of claim 1, wherein the structural body is tubular.

3. The work bench of claim 1, wherein the structural body has a trapezoidal cross-section.

4. The work bench of claim 1, wherein the platform further comprises a top surface, upon which a power tool can be installed thereon.

5. The work bench of claim 1, wherein the platform further comprises side surfaces that frictionally contact the structural body.

6. The work bench of claim 5, wherein the side surfaces end in respective flat foot portions.

7. The work bench of claim 1, further comprising an extension that can be installed at an end of said structural body.

8. The work bench of claim 1, further comprising a support mechanism installed at an end of said structural body for supporting an elongated work piece.

9. The work bench of claim 1, wherein the structural body has a square cross-section.

10. The work bench of claim 1, wherein the platform comprises an override mechanism for allowing horizontal movement of the platform along the structural body.

11. The work bench of claim 1, wherein the platform is movable along the structural body.

12. The work bench of claim 1, wherein the first axis is substantially parallel to the longitudinal axis of the structural body.

13. The work bench of claim 1, wherein the platform comprises a second hook portion contacting the structural body.

14. The work bench of claim 1, wherein the locking mechanism further comprises a handle and a plate disposed between the handle and the other of the structural body and the platform, the first hook portion coupled to the plate.

15. The work bench of claim 14, wherein the locking mechanism further comprises a spring for biasing the plate generally towards the handle.

16. The work bench of claim 1, further comprising a handle for moving the locking mechanism between the first and second positions.

17. The work bench of claim 1, wherein the first axis is substantially horizontal.

18. The work bench of claim 1, wherein the locking mechanism further includes a locking side surface that is movable relative to the platform, the first hook portion coupled to the locking side surface, the platform further including a second side surface, wherein the locking mechanism moves the locking side surface and the first hook portion relative to the structural body as the locking mechanism rotates from the second position to the first position to grip the structural body between the locking side surface, the first hook portion, and the second side surface.

19. The work bench of claim 18, further comprising a second hook portion that is coupled to the second side surface, wherein the locking mechanism moves the locking side surface and the first hook portion relative to the structural body as the locking mechanism rotates from the second position to the first position to grip the structural body between the locking side surface, the first hook portion, the second side surface, and the second hook portion.

\* \* \* \* \*